United States Patent
Bodor

(10) Patent No.: US 7,442,400 B2
(45) Date of Patent: *Oct. 28, 2008

(54) EGG REPLACER COMPOSITION AND METHOD FOR MAKING A BAKERY PRODUCT THEREWITH

(75) Inventor: Janos Bodor, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 584 days.

This patent is subject to a terminal disclaimer.

(21) Appl. No.: 11/053,808

(22) Filed: Feb. 9, 2005

(65) Prior Publication Data

US 2005/0181113 A1    Aug. 18, 2005

(30) Foreign Application Priority Data

Feb. 13, 2004    (EP)    .................................. 04075455

(51) Int. Cl.
    *A23L 1/20*    (2006.01)
(52) U.S. Cl. ........................ 426/656; 426/614; 426/634
(58) Field of Classification Search ................. 426/614, 426/634, 656
    See application file for complete search history.

(56) References Cited

U.S. PATENT DOCUMENTS

| | | | |
|---|---|---|---|
| 3,928,632 A | 12/1975 | Glaser et al. | |
| 4,072,764 A | 2/1978 | Chess | |
| 4,103,038 A | 7/1978 | Roberts | |
| 4,120,986 A | 10/1978 | Lynn | |
| 4,182,779 A | 1/1980 | Chess | |
| 4,296,134 A | 10/1981 | Boldt | |
| 4,360,537 A | 11/1982 | Tan et al. | |
| 5,725,899 A | 3/1998 | Cole et al. | |
| 6,878,394 B2 * | 4/2005 | Bodor et al. | ................ 426/656 |
| 2004/0166230 A1 | 8/2004 | Bodor et al. | |

FOREIGN PATENT DOCUMENTS

| | | |
|---|---|---|
| EP | 0 953 289 | 11/1999 |
| GB | 1 533 084 | 11/1978 |

OTHER PUBLICATIONS

European Search Report No. EP 04 07 5455 dated Jul. 20, 2004—2 pp.
Co-Pending, WO 2004/073423 A1 Bodor et al. Feb. 5, 2004 "Egg Replacer Concentrate and Liquid Egg Replacer".

* cited by examiner

*Primary Examiner*—Carol Chaney
*Assistant Examiner*—Nikki H Dees
(74) *Attorney, Agent, or Firm*—Ellen Plotkin

(57) ABSTRACT

An egg replacer composition is provided that has a low cholesterol content and that can be used for preparing bakery products. It includes, calculated on dry matter, 35-85 wt % protein, 10-50 wt % vegetable oil, 0.5-5 wt % stearoyl lactylate, 0.5-15 wt % carbohydrate and optionally vegetable lecithin in an amount, expressed as phosphatides, not exceeding 3 wt %. The cholesterol content is less than 0.5 wt %. The protein includes soy protein and egg white protein, at least half of the protein being soy protein. The PDI is at least 60%.

13 Claims, No Drawings

EGG REPLACER COMPOSITION AND METHOD FOR MAKING A BAKERY PRODUCT THEREWITH

The invention relates to an egg replacer composition that has a low cholesterol content and that can be used in the preparation of bakery products and to bakery products containing the egg replacer composition.

Egg is a versatile food and food component. An important use of eggs is in the preparation of bakery products. In particular the preparation of products such as cakes and muffins depends heavily on the functional and organoleptic contribution from eggs. However, the cholesterol content of eggs causes concern. In addition, there are health issues regarding its saturated fatty acid content and the risk of salmonella contamination. The limited shelf life and high costs of eggs also give rise to concern. To address such issues many compositions have been proposed to replace eggs.

U.S. Pat. No. 4,072,764 describes an egg yolk extender that comprises full fat soy flour, grain flour, lecithin, a further emulsifier and a humectant. The composition can be used in the preparation of bakery products, e.g. cakes.

U.S. Pat. No. 4,103,038 discloses an egg replacer composition based on ultrafiltration whey protein, fats and emulsifier.

U.S. Pat. No. 4,120,986 describes the preparation of a high protein content material that contains 25-55% protein, 5-15% fat and 25-50% carbohydrate, which is then further processed with emulsifier, lecithin, pregelatinized starch and gum to provide an egg replacer. The composition can be used for making cakes.

U.S. Pat. No. 4,182,779 describes a composition that can be used to extend egg yolk. It contains defatted soy flour with a PDI of less than 60, oil, grain flour, lecithin and a gum. The composition can be used e.g. for making cakes.

U.S. Pat. No. 4,296,134 describes a liquid egg blend which contains less than 1.25 wt % fat and which comprises 60-96 pbw egg whites, 0-18 pbw water, 2-10.5 pbw protein replacement and small amounts of stabilizer, flavouring and colouring.

U.S. Pat. No. 4,360,537 and GB 1 533 084 disclose the preparation of a lipoprotein emulsion system based on soy isolate that can be used to replace egg yolk in various food products. In the preparation high amounts of soluble carbohydrates and lecithin are included. The preparation can be used e.g. for making cakes.

U.S. Pat. No. 5,725,899 describes the preparation of a composition from soy flour and soy oil which on reconstitution in water forms a milk-like protein beverage.

Despite the intensive efforts, the egg replacer products have not been as successful as anticipated. A problem that remains is that in use often the Theological properties deviate substantially from those of eggs. Another problem is that in making bakery products with the egg replacement products, often the recipe of the bakery product needs to be adapted. This is not readily accepted in the bakery industry. The texture of the resulting baked product may be unacceptable. Other problems may arise because the preparation of a proposed egg replacer product may require complicated processing, sometimes requiring expensive equipment and/or the use of ingredients that are not readily available or expensive. There are also problems with off-tastes from certain ingredients or processing steps.

Our co-pending patent applications WO 2004/073 423 and U.S. 2004/0 166 230 are concerned with an egg replacer composition that has a low cholesterol content. It can be used, for example, for making omelets. It comprises a combination of proteins, oil and a restricted amount of carbohydrate.

We have now found an egg replacer composition that can be used as a replacer for eggs, egg yolk or egg powder in making bakery products. It provides an improvement with respect to at least some of the above mentioned problems compared with other cholesterol free egg replacer products. Typically it is not necessary to change the recipe for the bakery product. The egg replacer composition provides good rheological and organoleptic properties. It is easy to prepare from readily available materials.

The present invention provides an egg replacer composition that comprises, calculated on dry matter, 35-85 wt % protein, 10-50 wt % vegetable oil, 0.5-5 wt % stearoyl lactylate, 0.5-15 wt % carbohydrate, less than 0.5 wt % cholesterol and optionally vegetable lecithin in an amount, expressed as phosphatides, not exceeding 3 wt %, wherein the protein comprises soy protein and egg white protein, at least 50 wt % of the protein is soy protein and the PDI is at least 60%.

The present egg replacer composition is intended in particular to replace part or all of the egg or egg powder in recipes for bakery products. Preferably the egg replacer composition is used to replace any egg and/or egg powder completely. An important objective is to reduce the cholesterol content of the baked good and accordingly a main objective is to replace egg yolk and egg yolk powder because egg white as such does not contain cholesterol.

The present invention also provides bakery product that comprises flour and, expressed on dry matter, preferably 1-25 wt % of the present egg replacer composition. The amount of egg replacer composition in the bakery product expressed on dry matter is more preferably 1-15 wt %, most preferably 2-10 wt %. The amount of egg replacer composition in the bakery product is expressed on dry matter, i.e. water is left out of consideration both from the egg replacer composition and from the baked product overall in determining this. The bakery product may include the usual ingredients. For example, the bakery product may contain sugar, fat, vanilla sugar, chocolate powder, lemon rind and other commonly used ingredients and combinations thereof. Preferably however, the bakery product is free of egg yolk and of egg yolk powder. The invention also provides a method for making a bakery product by preparing a dough that is free of egg yolk and of egg yolk powder and that comprises flour and, expressed on dry matter, 1-25 wt % of the present egg replacer composition, and baking the dough in an oven. The amount of egg replacer composition used in the process, expressed on dry matter, is preferably 1-15 wt %, more preferably 2-10 wt %.

In a preferred embodiment, the egg replacer composition is a concentrate having a low moisture content. Preferably the egg replacer composition comprises 90-99 wt % dry matter and 1-10 wt % moisture. In this embodiment the composition can have a very good shelflife. It can be used as such in the preparation of bakery products as a replacer for egg powder. To make the concentrate ready for use as a liquid egg replacer it only needs to be dispersed in water. In this specification, the present egg replacer composition in the embodiment that comprises 90-99 wt % dry matter and 1-10 wt % moisture is also referred to as a concentrate.

In another preferred embodiment the egg replacer composition comprises 16-30 wt % dry matter and 70-84 wt % moisture. In this embodiment the composition is typically liquid and can be used as a one-to-one replacer of whole eggs in bakery recipes. In this specification this embodiment is also referred to as the liquid egg replacer or the liquid egg replacer composition.

Examples of bakery products for which the functional and organoleptic contribution of egg or egg powder is critical are muffins and pound cakes.

The presence of stearoyl lactylate emulsifier is a key aspect of the present invention. The amount of the stearoyl lactylate, calculated on dry matter, should be 0.5-5 wt %. Only the active component of the stearoyl lactylate preparation is included in the amount, i.e. any component such as lactic acid is excluded in calculating the amount. On the other hand, the kation, e.g. sodium or calcium, is included in the calculation of the amount of stearoyl lactylate. This emulsifier contributes to the structuring properties of the egg replacer in bakery applications, notably to the ability to retain air during the baking so that the resulting baked product has a good volume. It can also help to avoid so-called "banks" (wet parts) in the baked product. Preferably, the stearoyl lactylate is sodium stearoyl lactylate (SSL) or calcium stearoyl lactylate (CSL) or a combination thereof. Most preferably SSL is present in the composition. The amount of stearoyl lactylate is preferably 1-4 wt % calculated on the dry matter of the egg replacer composition. Examples of suitable stearoyl lactylate preparations are Admul SSL 2012 obtainable from Quest International, Netherlands and Grindsted SSL P55 obtainable from Danisco, Denmark.

The egg replacer composition preferably also includes a small amount of a second emulsifier. It is particularly preferred for the composition to include vegetable lecithin, in particular soy lecithin and/or sunflower lecithin. Commonly available lecithin materials can be used, e.g. materials that contain 30-45 wt % oil and 50-65 wt % phosphatides. The amount of the second emulsifier preferably is 0.05-3 wt %, calculated on the dry matter of the egg replacer composition. Here also, the amount of emulsifier indicates the emulsifier perse, i.e. the phosphatides excluding the carrier oil. More preferably, the egg replacer composition includes lecithin in an amount of 0.1-1 wt %, especially 0.15-0.3 wt %. Other emulsifiers may also be used as such or in combination with lecithin as second emulsifier besides the stearoyl lactylate. Preferably the emulsifier employed has a HLB value of at least 8. Examples of emulsifiers that may be used in combination with lecithin or instead thereof as second emulsifier are:

- lysolecithin, e.g. Max Emul 322 ex Central Soya, Fort Wayne, USA,
- phosphatidylcholine rich fractions of lecithins, e.g. Leci-Choline ex Lucas Meyer by, Netherlands,
- polysorbates, e.g. Tween 60, and
- combinations of two or more thereof.

The second emulsifier can contribute to the ease of preparation of the liquid egg replacer and its stability. Lecithin facilitates in particular also obtaining the desirable thickness of the egg replacer in liquid form. At lower lecithin content, the liquid egg replacer becomes thicker. However, high emulsifier contents may adversely affect the taste and mouthfeel of the final food product prepared with the egg replacer. They may also have adverse effects on the structure of the baked goods. Therefore, the upper limits indicated for the emulsifier amounts should preferably not be exceeded.

The amount and composition of protein is another key aspect of the present invention. To obtain good rheological properties the overall protein content should be relatively high, the protein should comprise soy protein and egg white protein, at least half of the protein being soy protein.

The protein materials employed to provide the protein for the egg replacer composition should contain protein that has retained most of its functionality. We have found that in practice this is correlated with the PDI (Protein Dispersibility Index) measured at 20° C. The PDI should be at least 60%. Preferably it is at least 65%, more preferably at least 70%. PDI can be measured according to the method AOCS Ba 10-65 (99) at 20° C.

If the PDI of the individual protein materials to be included in the egg replacer composition are known, then the PDI of the protein in the egg replacer composition usually can be estimated by calculating the average based on the amounts of the materials to be included in the composition. Preferably the PDI of each of the protein materials to be included in the composition is at least 50%, more preferably at least 60%.

The material used to provide the soy protein in the composition preferably is soy concentrate or soy isolate, soy isolate being preferred. Such soy protein materials typically have a protein content of about 80 wt % or more. Examples of suitable soy protein materials are Pro Fam 974, Pro Fam 892 and Pro Fam 891, which are available from ADM, Netherlands, and Newpro TS, which is available from Lucas Meyer by, Netherlands. The soy protein content of the egg replacer composition, calculated on dry matter, is preferably 20-55 wt %, more preferably 25-50 wt %.

The material used to provide egg white protein in the composition preferably is egg white powder. Egg white powder typically has a protein content of about 75 wt % or more. Examples of suitable egg white powders are dried egg white powder from Nive, Netherlands and EAP-R from Belovo, Belgium. Egg white powder may include some carbohydrate. It may for example include about 5% glucose. The amount of egg white protein in the egg replacer composition, calculated on dry matter, is preferably 5-30 wt %, more preferably 10-25 wt %.

The egg replacer composition preferably further comprises milk protein. The milk protein in the composition is preferably mostly whey protein. More preferably 70-100 wt % of the milk protein is whey protein. Whey protein can be provided in the composition by using e.g. whey protein concentrate or isolate powder. For example, whey protein concentrate powder prepared by partial removal of lactose via crystallization and whey protein isolate prepared via ultrafiltration of whey can suitably be used in the preparation of the egg replacer composition. Fractionated whey protein, e.g. a beta-lactoglobulin rich fraction, may be used instead of or in combination with more common milk protein materials. Alternatively, or in combination with a whey protein source, e.g. skim milk powder can be used. Examples of suitable milk protein materials are Domovictus 835, a whey protein concentrate from Borculodomo, Netherlands, Lacprodan 80 and Lacprodan 70 from Danmark Protein, Denmark, supplied by MD Foods, Netherlands and Ultra Whey 99, a whey protein isolate from Lithos Food BV, Netherlands. The milk protein content of the egg replacer composition, calculated on dry matter, is preferably 0.5-6 wt %, more preferably 1.0-5.0 wt %.

The milk protein material used to provide milk protein in the composition can suitably have a protein content of about 30 wt % to about 90 wt %. Such materials usually contain a considerable amount of lactose, e.g. 5-60 wt %. The use of lactose in moderate amounts in the composition can help to prevent the viscosity of the liquid egg replacer from becoming too high. If somehow it is preferred not to use lactose or to keep its content low, then a similar contribution to viscosity control can be obtained using other sugars, e.g. glucose, fructose, saccharose or starch hydrolizates with a high dextrose equivalent.

The protein content of the egg replacer composition, calculated on dry matter, should be 35-85 wt %. Preferably it is 45-70 wt %, more preferably 50-63 wt %. The weight ratio of soy protein and egg white protein in the egg replacer composition is preferably between 1:1 and 5:1, more preferably between 1.5:1 and 3.5:1. The weight ratio of the egg white protein and the milk protein, if present, in the egg replacer composition is preferably at least 2:1, more preferably at least 4:1. This applies in particular if the milk protein is largely whey protein.

The amount and type of proteins has a substantial influence on the Theological properties. The liquid composition that is to be used to replace eggs should have a relatively low viscosity. If the baker leaves it to stand for a few hours before using it further, the viscosity should not increase too much and the replacer should not gel to a substantial degree. If the viscosity increases or some gelation takes place upon standing, the structure should be destroyed and the material restored to pourability easily e.g. by whisking by hand or with a mixer. A low PDI of the protein is likely to cause a high viscosity of the liquid egg replacer composition, which will increase further upon standing. Typically, higher protein contents result in higher viscosity. Similarly, if milk protein from skimmed milk powder is used, the viscosity will typically be higher than if whey protein is used in the composition. However, the liquid egg replacer composition should not be too thin either.

The combination of proteins used also influences the structure development during further preparation of the product to be eaten and the texture of the resulting bakery product. Also the organoleptic properties are influenced by the protein composition.

Preferably 55-80 wt %, more preferably 60-75 wt % of the protein of the egg replacer composition is soy protein. In a particularly preferred embodiment the egg replacer composition comprises, calculated on dry matter, 25-50 wt % soy protein, 1-5 wt % whey protein and 10-25 wt % egg white protein.

The egg replacer composition should further include, calculated on dry matter, 10-50 wt % vegetable oil. Preferably the oil content is 20-40 wt %, especially 25-35 wt %. Fat or oil from fish or other animal origin is preferably not deliberately included although small amounts of animal fat originating e.g. from a milk protein source can be tolerated. The use of animal fat or oil may cause an increase of the cholesterol content of the product and it may cause off-flavor, depending on the origin of the fat or oil. The vegetable oil used in the egg replacer composition preferably is liquid at ambient temperature, although some solids can be tolerated. The solid fat content of the vegetable oil at 35° C. preferably is less than 6 wt %, more preferably it is 0-3 wt %. At 5° C., the solid fat content of the liquid oil is preferably less than 30, more preferably it is 0-10 wt %. Most preferably the solid fat content is 0-2 wt % at 5° C. The solid fat content can suitably be measured as the N-value by means of NMR. Preferred types of vegetable oil are sunflower oil, peanut oil, olive oil, safflower oil, soybean oil, low erucic acid rapeseed oil, corn oil, cottonseed oil, and combinations of two or more thereof. Such oils have low contents of saturated fatty acids. Sunflower oil is particularly preferred in the present composition, for example the sunflower oil type that is rich in oleic acid residues, the so-called High Oleic Sunflower Oil (HOSF). Palm oil and fractionated palm olein may be used in stead of the above mentioned oils or in combination with one or more thereof as the vegetable oil in the egg replacer composition.

The presence of the vegetable oil in the egg replacer composition influences the rheological properties of the egg replacer and of the bakery product prepared with it. Special measures during the preparation of the egg replacer composition that result in a very fine dispersion of oil droplets in the egg replacer are preferably avoided. A fine oil droplet dispersion may raise the viscosity of the egg replacer and may adversely affect the mouthfeel of the food product to be consumed. In the liquid egg replacer composition, the volume weighed mean diameter of the oil droplets preferably is 1-50 micron, more preferably 2-30 micron. The volume weighed mean diameter (D4.3) can be measured with a Coulter Counter Multisizer II, Coulter Electronics Ltd, Luton, UK.

The carbohydrate content of the egg replacer composition, calculated on dry matter, should be 0.5-15 wt %, preferably it is 1-10 wt %, more preferably 1-7 wt %. Some carbohydrates may be provided by the protein materials used to constitute the composition. Milk protein material may include lactose. The soy protein material may include some oligo- and/or polysaccharides. Some carbohydrate may be deliberately included to optimize the texture of the product, e.g. gums or starch. Soluble carbohydrates, especially sugars, can contribute to prevent the liquid egg replacer composition from being too thick. However, at high sugar content, the viscosity may become too low. High amounts of carbohydrates such as starches and gums and other polysaccharides will cause the liquid egg replacer composition to be too viscous and to become more viscous upon standing before preparation of the final food product. High amounts of carbohydrates may also adversely affect the taste and texture of the final product. The amount of soluble carbohydrates, especially sugars, in the egg replacer composition, calculated on dry matter, is preferably 0.5-8 wt %, more preferably 1-5 wt %. The amount of oligo- and polysaccharides in the egg replacer composition preferably is 0-6 wt %, more preferably 0.1-1 wt % of the dry matter. In particular the amount of thickening polysaccharides, e.g. starches and gums such as pectin, carboxy methyl cellulose, xanthan gum and guar gum, in the egg replacer composition is preferably less than 1 wt % of the dry matter of the composition. However, such gums, when present in small amounts, can make a positive contribution e.g. to stabilize air.

The final bakery product prepared with the egg replacer composition should have a substantially reduced cholesterol content compared with the corresponding product prepared with egg or egg yolk. The cholesterol content of eggs, expressed on dry matter is typically about 2 wt %. The cholesterol content of the egg replacer composition should be less than 0.5 wt %, calculated on dry matter. Preferably it is less than 0.1 wt %, more preferably less than 0.05 wt %. A low cholesterol content is readily achieved by avoiding the incorporation of materials with high cholesterol contents such as egg yolk powder and milk fat. The present composition further may contribute to a diet designed to avoid high blood cholesterol levels by the avoidance of high amounts of saturated fatty acids and by the presence of soy protein.

The egg replacer composition may include additional minor components such as colourants, flavour formulations, seasoning, salt, food acids, preservatives and the like. The combined amount of minor components, other than those mentioned above like emulsifiers and carbohydrates, calculated on dry matter, preferably does not exceed 5 wt %, more preferably it is 0.3-3 wt %, especially 0.5-2 wt %. For example, materials such as glycin, vitamin C and tocopherols may improve the oxidative stability of the composition and they may beneficially be included in small quantities.

The egg replacer composition can easily be prepared. For example to prepare a low moisture concentrate, any powder materials to be included can be dry mixed. Oily materials, e.g. lecithin and tocopherol mix if used, can be dispersed in the vegetable oil. If the vegetable oil to be used contains solids at the ambient temperature, it is suitably heated to melt it. The oil phase thus obtained can be sprayed onto the powder mix. Mixing is continued until a good distribution of the oil is obtained. The resulting concentrate can be a powder or a paste, depending on the amounts and types of materials used.

A mixture of materials to constitute the egg replacer concentrate may beneficially be treated by passage through a roller mill. Such treatment decreases the particle size of the protein powders and increases the surface binding of oil. It may facilitate the subsequent preparation of the liquid egg replacer composition.

To obtain good storage stability of the egg replacer concentrate it is preferably ensured that the moisture content of the concentrate does not exceed 7 wt %. More preferably the moisture content is less than 5 wt %. This can readily be achieved by choosing materials to be included in the concentrate that have a sufficiently low moisture content and adequate packaging materials and storage conditions of the raw materials before production and of the prepared concentrate after it has been produced. Most of the moisture in the concentrate is likely to originate from the protein materials used. Preferably the protein materials chosen for the present concentrate have a moisture content of less than 9 wt %, especially less than 7 wt %. By an appropriate choice of raw materials and hygienic working practices it can readily be ensured that the concentrate has good microbiological properties and notably is free from salmonella contamination.

A liquid egg replacer composition with the desired composition, preferably comprising 16-30 wt % dry matter and 70-84 wt % moisture, can readily be prepared from a concentrate as described above by mixing with water. In deciding the mixing ratio the moisture content of the concentrate should be taken into account. Mixing can be done e.g. in a food processor or with a hand mixer as commonly available in kitchens or with another mixing device that is available at the place of the preparation. For production at an industrial facility the concentrate can be dispersed in water to provide the liquid egg replacer composition using e.g. a stirred tank with a Silverson mixer or a colloid mill. The liquid egg replacer composition thus obtained can be used instead of whole eggs following the recipe of choice for the preparation of the baked product. It may e.g. be used to prepare baked products such as pound cakes, muffins and the like. The optimal amount of water to be used with the egg replacer concentrate, depends to some degree on the precise composition of the egg replacer concentrate. This can readily be determined by first using a relatively low amount of water. If the liquid egg replacer composition is then thicker than desired, somewhat more water can be mixed in.

The viscosity of the liquid egg replacer composition usually is at least 150 mPas at 20° C. and 0.15 s$^{-1}$. Preferably the viscosity is 300-20 000 mPas, more preferably 400-8000 mPas, especially 500-5000 mPas at 20° C. and 0.15 s$^{-1}$. Most preferably it is less than 3000 mPas. The viscosity of the liquid egg replacer composition preferably stays within these limits for a period of at least 1 hour, more preferably at least 2 hours after preparation of the composition from the egg replacer concentrate if kept at a temperature of 20° C. To obtain reproducible measurements on viscosity, the incorporation of air in the liquid egg replacer should preferably be avoided.

Therefore, in such case, the liquid egg replacer can suitably be prepared from the egg replacer concentrate and water using a vacuum mixer, e.g. a Stephan mixer during 5 minutes at 900 rpm, using its vacuum function. The viscosity can suitably be measured using a Brookfield viscometer (model DV-II+) using the T-D or the S04 spindle at 10 rpm.

The pH of the liquid egg replacer composition preferably is 6.0-8.0, more preferably it is 6.0-7.5, most preferably it is 6.2-7.0. At high pH, the viscosity of the liquid egg replacer becomes too high. A somewhat lower pH can be beneficial also because it raises the temperature at which the proteins coagulate and brings it closer to the temperature at which coagulation occurs if eggs are used. A too low pH may however cause denaturation of the proteins, which is preferably avoided. Depending on the composition of the egg replacer concentrate, the pH of the liquid egg replacer prepared therefrom can be adapted if so desired by including small amounts of acidic or alkaline components in the egg replacer concentrate. To lower the pH e.g. food acids such as lactic, phosphoric, citric, ascorbic or fumaric acid or a combination of 2 or more of such acids can be used. The pH can be raised e.g. with trisodium phosphate, disodium orthophosphate, sodium carbonate or bicarbonate and or another food grade alkaline agent.

While it is preferred to prepare the liquid egg replacer composition from a concentrate as described above, this is not necessary. If so desired, the liquid egg replacer can be prepared directly. For example, the powder materials can be dissolved or dispersed in an appropriate amount of water to obtain the aqueous phase composition. The oily materials are mixed and, if necessary, heated to obtain the oil phase composition. The oil phase composition is then dispersed into the aqueous phase composition e.g. using a food processor or colloid mill.

The egg replacer composition used to prepare the dough for the bakery product can be a concentrate or a liquid egg replacer composition. They can be used to replace egg powder and whole eggs, respectively, in a 1:1 weight ratio. However, if so desired, in a recipe using e.g. whole eggs or egg yolks, a corresponding amount of egg replacer concentrate may be used while adapting the liquid content, usually water content, elsewhere in the recipe. Preferably, however, in existing recipes, whole eggs are preferably replaced on a 1:1 weight basis with liquid egg replacer and egg powder or egg yolk powder is preferably replaced on a 1:1 weight basis with an egg replacer concentrate.

Throughout this specification all parts, percentages and ratios are by weight unless otherwise indicated. By "dry matter" or "dry contents" is meant all contents of a composition except for the water contained in that composition. Except in the operating and comparative examples, or where otherwise explicitly indicated, all numbers in this description indicating amounts of material ought to be understood as modified by the word "about".

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

EXAMPLE I

Two egg replacer base compositions were prepared from the ingredients listed in Table 1.

TABLE 1

| | | Amount (pbw) | |
|---|---|---|---|
| Phase | Ingredient | A | B |
| Oil phase | Sunflower oil (High Oleic) | 30.69 | 30.69 |
| | Lecithin | 0.34 | 0.34 |
| | Flavour | 0.01 | 0.01 |
| | Tocopherol mix (70% tph) | 0.01 | 0.01 |
| | Colourant (30% carotene) | 0.01 | 0.01 |
| Powder phase | Soy protein isolate(Pro Fam 974) | 45.67 | 41.58 |
| | Egg white powder | 22.90 | 21.13 |
| | Whey protein concentrate | — | 5.86 |
| | Low Methoxy Pectin | 0.43 | 0.43 |
| | Citric acid | 0.16 | 0.16 |
| | Ascorbic acid | 0.03 | 0.03 |
| | Glycin | 0.02 | 0.02 |
| | Salt | 0.64 | 0.64 |
| | Flavour | 0.26 | 0.26 |
| | Sodium hydrogen carbonate | 0.34 | 0.34 |
| | Creamer powder | 1.67 | 1.67 |

The lecithin used was Topcithin NGM, a soybean lecithin paste with a phospatide content of 60 wt % from Degussa, Netherlands.

Pro Fam 974 is a soy protein isolate (protein content 91 wt %, PDI 75% at 20° C.) from ADM, Netherlands. The egg white powder used was dried egg white powder, non whippable from Nive, Netherlands (protein content 81 wt %, PDI 100%). The whey protein concentrate was Domovictus 835 from Borculodomo, Netherlands (protein content 35 wt %, PDI 100%). The creamer powder was DP644 obtained from DMV International, Netherlands. It contained 78 wt % vegetable oil and 22 wt % milk solids (15 wt % lactose and 6.5 wt % protein). The low methoxy pectin was LM-101-AS ex CP Kelco, Denmark.

The ingredients of each of the phases were mixed and the two mixtures were then combined and mixed for 5 minutes in a Hobart mixer. The resulting egg replacer concentrates were dry pastes.

For each of the resulting egg replacer concentrates the moisture content was about 3 wt %. Composition A had a carbohydrate content, calculated on dry matter, of about 3 wt %. The carbohydrate content of composition B was about 6 wt % on dry matter. The cholesterol content was less than 0.001 wt % in each case. The PDI was about 83% for both compositions. The weight ratio of soy protein and egg white protein was 2.2 for both compositions. The portion of protein constituted by soy protein was 69 and 66 wt % in compositions A and B, respectively. The weight ratio of egg white protein and whey protein in composition B was 8.3.

The compositions A and B were then used to prepare a series of egg replacer concentrates containing SSL as described in Table 2. "SSL 2012" mentioned in the table is Admul SSL 2012, a sodium stearoyl lactylate preparation that was obtained from Quest International, Netherlands. It includes 65% sodium stearoyl lactylate and 35 wt % lactic acid. The composition A or B in the indicated amount was mixed with the SSL for 5 minutes in a Hobart mixer at speed 1.

Liquid egg replacer compositions were made by mixing the concentrate with water in a Stephan mixer at 900 rpm in the amount as indicated in table 2. The amounts of stearoyl lactylate, soy protein, egg white protein, whey protein and the total amount of protein in each composition, calculated as wt % on dry matter, are indicated in table 2 as well.

Each of the compositions was used to prepare cakes using the following recipe:
225 pbw sugar
25 pbw vanilla sugar
190 pbw cake margarine (Trio super ex Unipro, Netherlands)
250 pbw liquid egg replacer composition as indicated in Table
2 pbw water
250 pbw cake flour (Ibis ex Meneba, Netherlands)
8 pbw baking powder The margarine was warmed to 27° C. The margarine and sugar were creamed in a bowl with a Hobart mixer using the wirewhisk for 3 minutes at speed 3. The liquid egg replacer composition and water were added. Mixing was continued for 1 minute at speed 3. The baking powder and flour were sieved together, added to the bowl, and the composition was mixed for 1 minute at speed 1 and for 2 minutes at speed 3. The dough was filled in cake tins and the cakes were baked in an oven at 170° C. for 60 minutes. The specific volume of the cakes was measured twice for each recipe. The specific volume of the batter and the average specific volume of the cake for each recipe is also shown in table 2. The amount of egg replacer composition in the dough and in the bakery products, expressed on dry matter, was between 8 and 9 wt % for all samples.

For the samples without SSL the volume of the resulting cake was lower than desirable. For the samples B-4 and especially A-4, with the high SSL contents, the cakes tended to collapse when they were taken from the oven. Sample B-4 and especially A-4 also showed some dense, unbaked layers in the cake. The samples A-2, A-3, B-2 and B-3 all gave acceptable results. The samples with the lower amount of SSL were preferred over those with the higher amount of SSL. Those with whey protein were preferred over those without whey protein.

For comparison, example B-3 was repeated except that instead of the SSL 2012, Datem ester 1936 was used. The Datem ester was also of the Admul range of Quest International, Netherlands. The results were not good. The batter was dense and thick and had a specific volume of 1.12 ml/g. The specific volume of the cake was 1.88 ml/g.

EXAMPLE II

Egg replacer concentrates were prepared as described in Example I using the compositions shown in Table 3.

TABLE 2

| | Sample | | | | | | | |
|---|---|---|---|---|---|---|---|---|
| | A-1 | A-2 | A-3 | A-4 | B-1 | B-2 | B-3 | B-4 |
| Comp. A (pbw) | 103 | 103 | 103 | 103 | — | — | — | — |
| Comp. B (pbw) | — | — | — | — | 103 | 103 | 103 | 103 |
| SSL 2012 (pbw) | — | 3.2 | 6.3 | 9.4 | — | 3.2 | 6.3 | 9.4 |
| Water (pbw) | 325 | 325 | 325 | 325 | 325 | 325 | 325 | 325 |
| % soy protein | 41.6 | 40.3 | 39.1 | 38.0 | 37.9 | 36.7 | 35.6 | 34.6 |
| % EW protein | 18.6 | 18.0 | 17.5 | 17.0 | 17.1 | 16.6 | 16.1 | 15.7 |
| % whey protein | — | — | — | — | 2.0 | 2.0 | 1.9 | 1.9 |
| % total protein | 60.3 | 58.4 | 56.7 | 55.1 | 57.2 | 55.4 | 53.8 | 52.3 |
| % SSL | — | 2.0 | 3.9 | 5.6 | 0 | 2.0 | 3.9 | 5.6 |
| SV batter (ml/g) | 1.26 | 1.26 | 1.29 | 1.27 | 1.33 | 1.34 | 1.26 | 1.31 |
| SV cake (ml/g) | 1.99 | 2.03 | 2.08 | 2.05 | 1.83 | 2.10 | 2.16 | 2.03 |

TABLE 3

| Ingredient | Amount (pbw) | | | |
|---|---|---|---|---|
| | II | C-1 | C-2 | C-3 |
| Soy protein isolate | 39.23 | 39.23 | 37.45 | 37.45 |
| Sunflower oil | 28.72 | 16.40 | 2.68 | 15.35 |
| Lecithin | 0.32 | 12.64 | 13.37 | 0.70 |
| Sucrose | — | — | 14.00 | 14.00 |
| Disodium phosphate | — | — | 0.57 | 0.57 |
| Polysorbate 60 | — | — | 0.69 | 0.69 |
| SSL | 2.83 | 2.83 | 0.68 | 0.68 |
| Beta - carotene (1%) | 0.24 | 0.24 | 0.57 | 0.57 |
| Egg white powder | 19.77 | 19.77 | 30.00 | 30.0 |
| Tocopherol mix | 0.01 | 0.01 | — | — |
| Whey Protein Concentrate | 5.52 | 5.52 | — | — |
| Low methoxy pectin | 0.40 | 0.40 | — | — |
| Citric acid | 0.15 | 0.15 | — | — |
| Ascorbic acid | 0.04 | 0.04 | — | — |
| Glycin | 0.02 | 0.02 | — | — |
| Salt | 0.6 | 0.6 | — | — |
| Flavour | 0.25 | 0.25 | — | — |
| Sodium hydrogen carbonate | 0.32 | 0.32 | — | — |
| creamer | 1.57 | 1.57 | — | — |

The ingredients used were the same as in Example I except that the beta carotene was from DSM, the Netherlands, the egg white 10 powder was from Belovo, Belgium, the Polysorbate 60 was from Quest, the Netherlands and the flavour was from Danisco, Denmark.

The lecithin contents, as phosphatides, and the carbohydrate contents of the egg replacer concentrates expressed on dry matter were as shown in Table 4. The pH of the liquid egg replacer is also shown in Table 4.

TABLE 4

| | Example | | | |
|---|---|---|---|---|
| | II | C-1 | C-2 | C-3 |
| Egg replacer properties | | | | |
| Lecithin (Phosphatides) | 0.2 | 7.6 | 8.0 | 0.4 |
| Carbohydrate | 5 | 5 | 16 | 16 |
| pH | 6.6 | 6.7 | 7.2 | 7.3 |
| "Cake" properties | | | | |
| Batter SV | 1.18 | 1.08 | 0.95 | 1.21 |
| Cake SV | 2.18 | 1.93 | 1.82 | 2.06 |

With each of the concentrates a liquid egg replacer was prepared by mixing 1 pbw of concentrate with 3 pbw of water in a Stephan mixer at 900 rpm.

Pound cakes were prepared with each liquid egg replacer by the same method as described in Example I using the following materials:

400 pbw liquid egg replacer
320 pbw cake margarine
400 pbw castor sugar
0.5 pbw vanillin
15 pbw baking powder
400 pbw cake flour The specific volume of the batters and of the baked cakes are shown in Table 4. The cake of example II had good colour, texture, taste and sweetness. Overall it was a good cake. The cakes of examples C-1 and C-2 were poor and clearly unacceptable. Their colour was brownish and the taste was bitter. The texture was dense, in particular for sample C-2, and dry. The cake of sample C-2 was too sweet. The results of example C-3 were better than those of C-1 and C-2 but still not quite acceptable. It was too sweet and the texture was not satisfactory either.

The invention claimed is:

1. An egg replacer composition that comprises calculated on dry matter,
   35-85 wt % protein,
   10-50 wt % vegetable oil,
   0.5-5 wt % stearoyl lactylate,
   0.5-15 wt % carbohydrate,
   less than 0.5 wt % cholesterol and
   optionally vegetable lecithin in an amount, expressed as phosphatides, not exceeding 3 wt %,
   wherein the protein comprises soy protein, milk protein, and egg white protein, at least 50 wt % of the protein is soy protein and the PDI is at least 60%.

2. A composition according to claim 1 wherein the weight ratio of soy protein and egg white protein is between 1:1 and 5:1.

3. A composition according to claim 1 wherein the milk protein is whey protein.

4. A composition according to claim 1 wherein 55-80 wt % of the protein of the composition is soy protein.

5. A composition according to claim 1 that comprises, calculated on dry matter, 25-50 wt % soy protein, 1-5 wt % whey protein and 10-25 wt % egg white protein.

6. A composition according to claim 1 wherein the stearoyl lactylate is sodium stearoyl lactylate.

7. A composition according to claim 1 that comprises vegetable lecithin.

8. A composition according to claim 1 wherein the vegetable oil content is 20-40 wt %, calculated on dry matter.

9. A composition according to claim 1 wherein the carbohydrate content is 1-10 wt % calculated on dry matter.

10. A composition according to claim 1 that comprises 1-10 wt % moisture and 90-99 wt % dry matter.

11. A composition according to claim 1 that comprises 16-30 wt % dry matter and 70-84 wt % moisture.

12. Method for making a bakery product by preparing a dough that is free of egg yolk and of egg yolk powder and that comprises flour and, expressed on dry matter, 1-25 wt % of an egg replacer composition according to claim 1 and baking the dough in an oven.

13. Bakery product that comprises flour and, expressed on dry matter, 1-25 wt % of an egg replacer composition according to claim 1.

* * * * *